(12) United States Patent
Potter et al.

(10) Patent No.: US 6,378,811 B1
(45) Date of Patent: Apr. 30, 2002

(54) CABLE RETAINER

(75) Inventors: Victor D. Potter, Cumming; Joseph A. Dukes, Dawsonville, both of GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/592,768

(22) Filed: Jun. 13, 2000

Related U.S. Application Data

(60) Provisional application No. 60/139,517, filed on Jun. 16, 1999.

(51) Int. Cl.$^7$ .................................................. F16L 3/22
(52) U.S. Cl. ...................... 248/68.1; 248/74.4; 248/65; 248/49
(58) Field of Search ................. 248/68.1, 74.1, 248/74.4, 316.4, 65, 49; 211/194, 74; 24/578, 459

(56) References Cited

U.S. PATENT DOCUMENTS

| | | | |
|---|---|---|---|
| 1,804,416 A | 5/1931 | Hathaway | 248/68.1 |
| D139,568 S | 11/1944 | Hinchman | 297/271.6 |
| D165,901 S | 2/1952 | Bloom et al. | 184/51 |
| 3,051,424 A | 8/1962 | Duhamel | 248/62 |
| 3,523,667 A | 8/1970 | Guerrero | 248/49 |
| 3,526,934 A | 9/1970 | Owen | 285/154.1 |
| 3,590,752 A * | 7/1971 | De Pew | 108/55.3 |
| 3,765,629 A | 10/1973 | Voelker et al. | 248/74.4 |
| 3,856,246 A * | 12/1974 | Sinko | 248/68.1 |
| 3,964,707 A | 6/1976 | Lewis | 248/49 |
| 3,968,323 A | 7/1976 | Blanchet | 174/135 |
| 4,114,241 A * | 9/1978 | Bisping | 403/188 |
| 4,167,211 A * | 9/1979 | Haller | 165/78 |
| 4,195,732 A | 4/1980 | Bell | 206/391 |
| 4,199,070 A | 4/1980 | Magnussen | 211/60.1 |
| 4,244,542 A * | 1/1981 | Mathews | 248/49 |
| 4,306,697 A | 12/1981 | Mathews | 248/68.1 |
| 4,395,009 A | 7/1983 | Bormke | 248/68.1 |
| 4,942,967 A * | 7/1990 | Schneider | 211/74 |
| 5,791,607 A * | 8/1998 | Thibault et al. | 248/58 |

FOREIGN PATENT DOCUMENTS

| | | | |
|---|---|---|---|
| DE | 38 24 197 A1 | * | 1/1990 |
| EP | 0 191 480 A2 | * | 8/1986 |
| EP | 0 555 550 A1 | * | 8/1993 |
| GB | 2 165 099 A | * | 4/1986 |

* cited by examiner

Primary Examiner—Anita King
Assistant Examiner—Holly N. Sy
(74) Attorney, Agent, or Firm—Robert A. McCann; Jay A. Saltzman

(57) ABSTRACT

A cable retainer that has a body with a trough formed therein that extends along a longitudinal axis and a retention post extension that is attached to and extends away from the body along a direction that is parallel to the longitudinal axis.

27 Claims, 4 Drawing Sheets

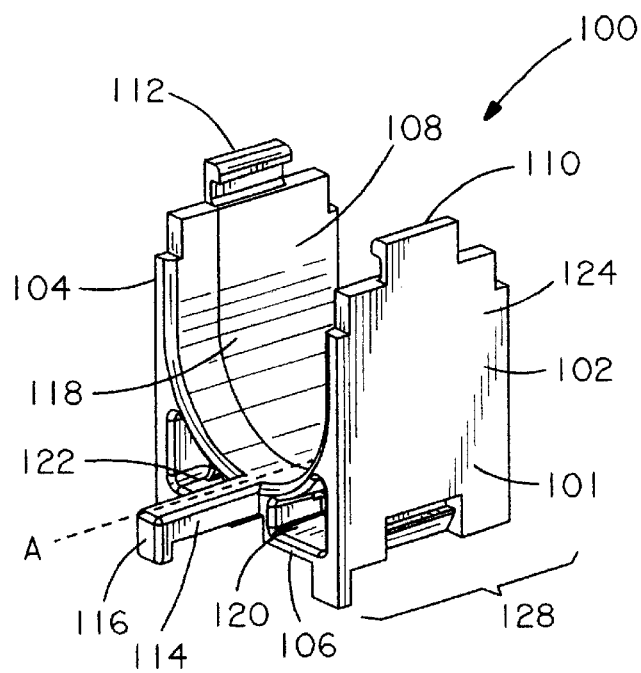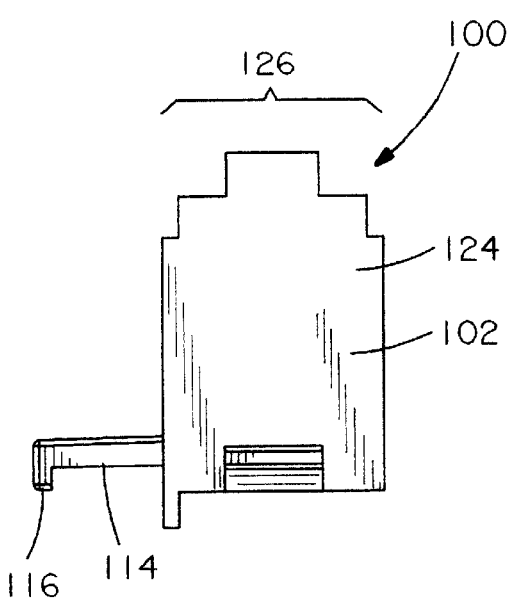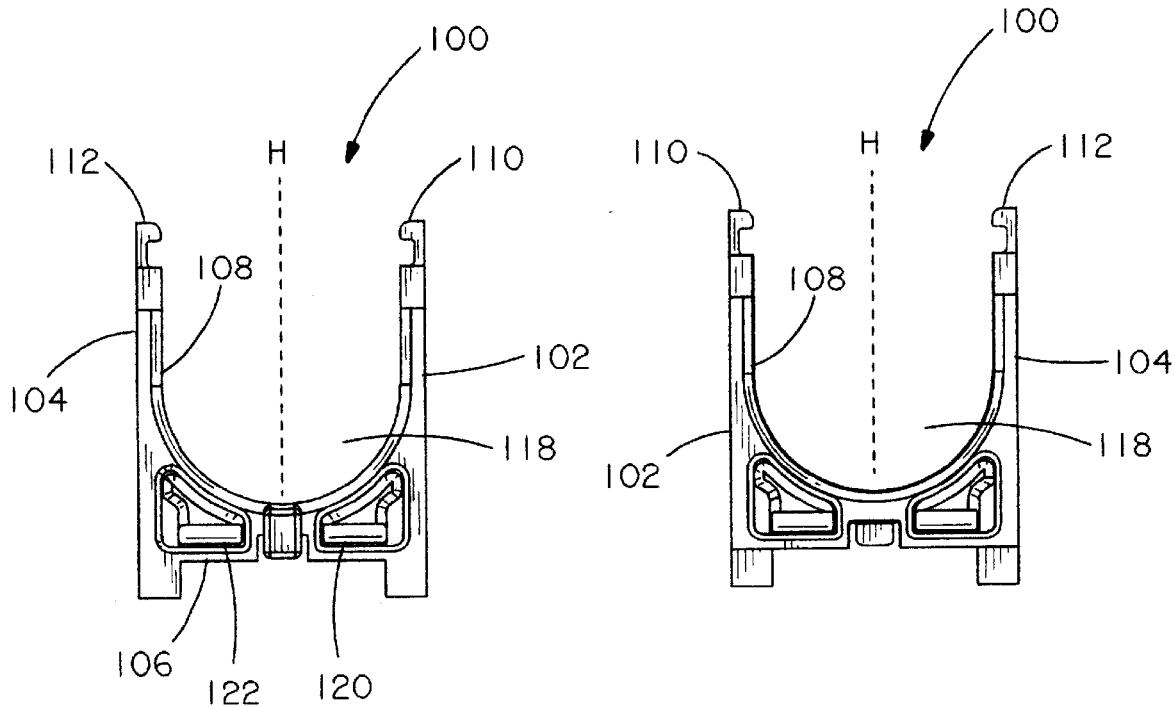

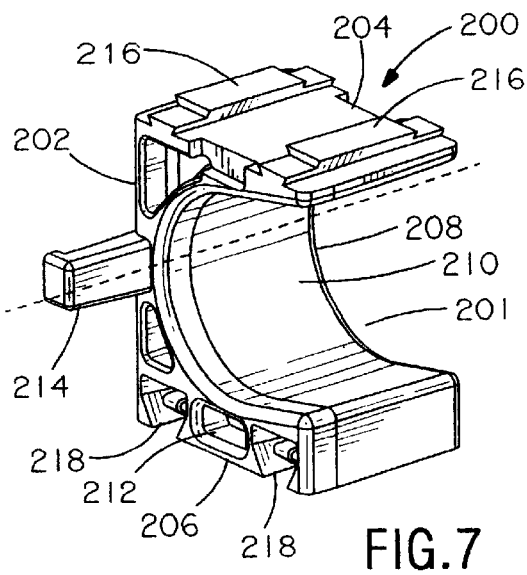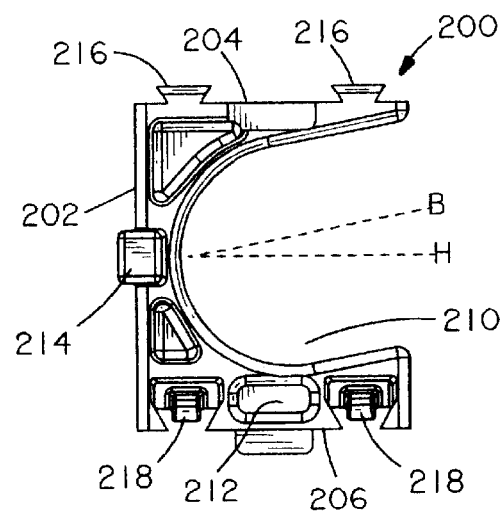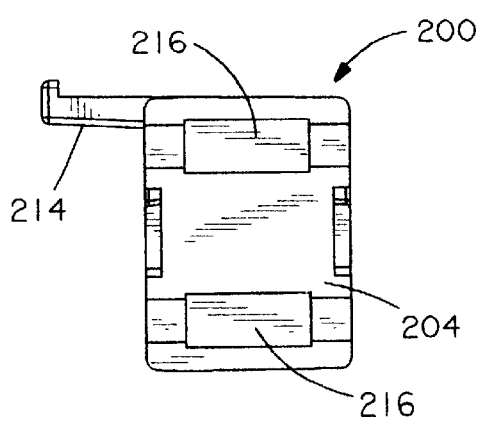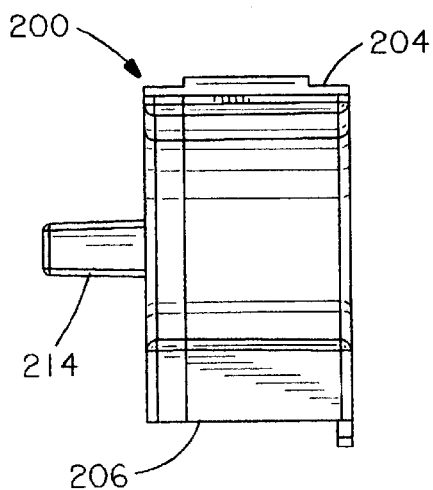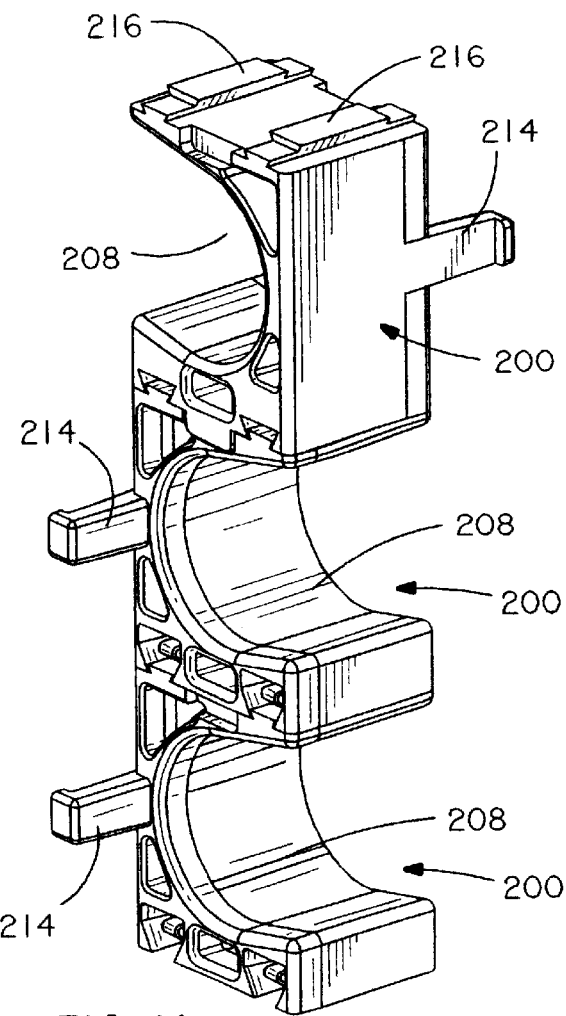

CABLE RETAINER

Applicants claim, under 35 U.S.C. §119(e), the benefit of priority of the filing date of Jun. 16, 1999, of U.S. Provisional Patent Application Ser. No. 60/139,517, filed on the aforementioned date, the entire contents of which are incorporated herein by reference.

BACKGROUND OF THE INVENTION

FIELD OF THE INVENTION

The present invention relates generally to cable retainer devices and more specifically to single and multiple, stackable cable retainer devices.

SUMMARY OF THE INVENTION

A first aspect of the present invention regards a cable retainer that has a body with a trough formed therein that extends along a longitudinal axis and a retention post extension that is attached to and extends away from the body along a direction that is parallel to the longitudinal axis.

A second aspect of the present invention regards a method of retaining a cable that includes providing a cable retainer that has a body with a trough formed therein that extends along a longitudinal axis and a retention post extension that is attached to and extends away from the body along a direction that is parallel to the longitudinal axis. The method further includes placing a cable within the trough and wrapping a cable tie around the cable and the retention post extension.

A third aspect of the present invention regards a cable retainer that has a first body with a first trough formed therein that extends along a longitudinal axis and a first latch structure. A second body includes a second trough formed therein that extends parallel to the longitudinal axis and faces the first body and a second latch structure that is complementary to and engages the second latch structure in a non-rotational manner, wherein the second trough does not face any troughs formed in the first body.

A fourth aspect of the present invention regards a cable retainer that has a first body with a first trough formed therein that extends along a longitudinal axis and a first latch structure. A retention post extension is attached to and extends away from the first body along a direction that is parallel to the longitudinal axis. A second body has a second trough formed therein that extends parallel to the longitudinal axis and a second latch structure that is complementary to and engages the second latch structure, wherein the second trough does not face the first trough.

One or more of the above aspects of the present invention allow a conventional cable tie to secure a cable bundle in place in a cable retainer.

One or more of the above aspects of the present invention allow for a simple way of stacking of a series of cable retainers in a secure manner.

One or more of the above aspects of the present invention allow for an easy way for removing cables or wires laid in a middle cable retainer that forms a part of a series of stacked cable retainers.

Details of the invention will be further explained in what follows by means of the embodiment represented in the drawings.

BRIEF DESCRIPTION OF SEVERAL VIEWS OF THE DRAWINGS

FIG. 1 is a top perspective view of a first embodiment of a cable retainer in accordance with the present invention;

FIG. 2 is a side view of the cable retainer of FIG. 1;

FIG. 3 is a front view of the cable retainer of FIG. 1;

FIG. 4 is a rear view of the cable retainer of FIG. 1;

FIG. 7 is a perspective view of a second embodiment of a cable retainer in accordance with present invention;

FIG. 8 is a side view of the cable retainer of FIG. 7;

FIG. 9 is a top view of the cable retainer of FIG. 7;

FIG. 10 is a front view of the cable retainer of FIG. 7;

FIG. 11 is a perspective view of a way of stacking cable retainers as shown in FIGS. 7–10 with one another;

DETAILED DESCRIPTION OF THE INVENTION

Figure 5:
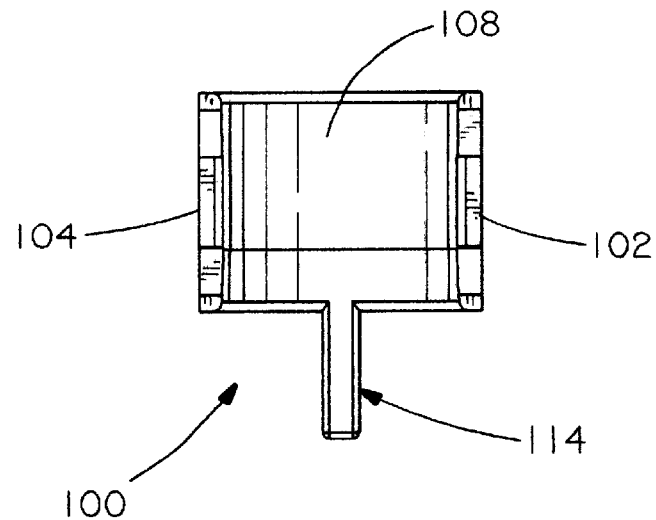
FIG. 5 is a top view of the cable retainer of FIG. 1.

FIGS. 1–5 show various different views of a vertical entry stackable cable management retainer 100, that, for example, could be commonly used in a ladder rack application. As can be seen from the many views, the cable retainer 100 generally has a substantially cube-shaped body 101 with three substantially planar sides 102, 104, 106 and one curvilinear U-shaped side 108. The two parallel side walls 102, 104 make up a vertical component and have facing latching components 110, 112, respectively, opposed at the upper extent of each side wall. A lower horizontally oriented bottom wall 106 joins the parallel sidewalls 102, 104 and forms the bottom of the device. Located adjacent the interface of the bottom wall 106 and the front face of the cable retainer is a retention post extension 114, which is attached to the body 101 and extends in the direction of the front face a certain distance and then depends downward. This retention post extension 114 allows a conventional cable tie to be wrapped around the retention post extension and a wire or cable bundle to secure in place the wire or cable bundle that were previously placed within the trough 118. The small downward projection 116 at the end of the retention post extension 114 prevents the cable tie from being disassociated with the cable retainer 100 when the cable bundle is placed under any type of load.

A substantially curvilinear U-shaped top wall 108 of the cable retainer 100 extends vertically downward into the body of the cable retainer 100 forming a cable trough 118. As shown in FIG. 1, the trough 118 extends along a longitudinal axis A that is parallel to the direction in which the retention post extension 114 extends. In addition, the trough 118 is symmetric with respect to a plane H that is perpendicular to the bottom of the trough 118 defined by wall 108 as shown in FIGS. 3 and 4. A bundle of wires or cables are placed therein and secured as previously described above. Two cable tie slots 120, 122 extend through the cable retainer body 124 from the front face to the back face in parallel axial alignment with the retention post extension 114 to provide securement for the cable retainer 100 to a substrate, ladder rack or other foundation. Generally, conventional cable ties may be guided through the slots 120, 122 and manipulated in a conventional attachment manner in order to provide positive securement of the cable retainer 100 to a substrate.

Figure 6:
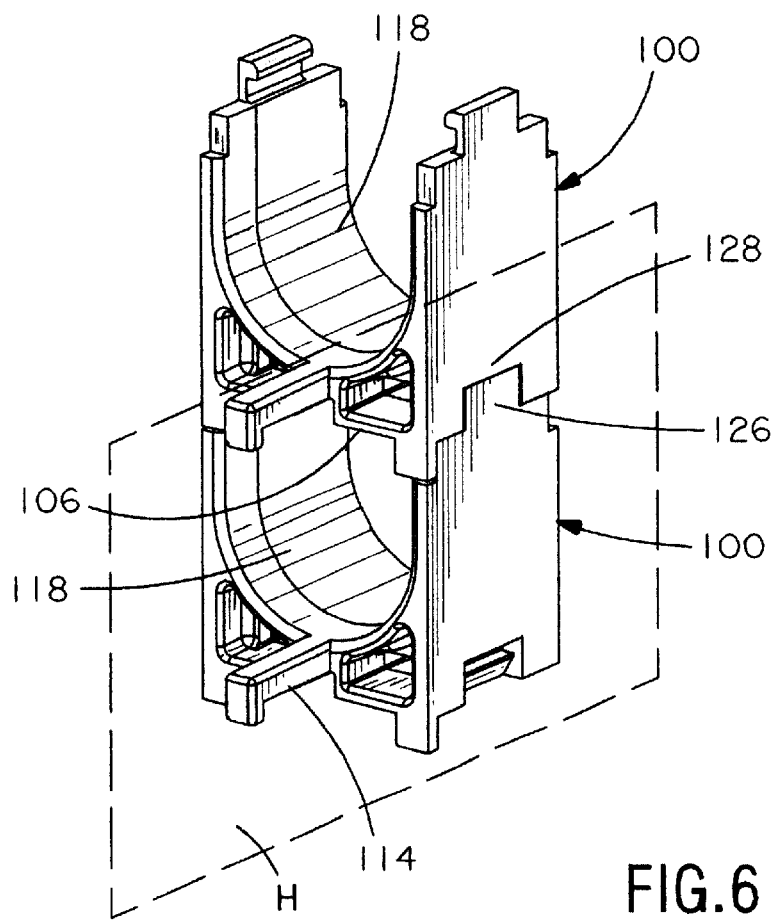
FIG. 6 is a perspective view of a first way of stacking two cable retainers as shown in FIGS. 1–5 with one another.

As shown in FIG. 6, subsequent cable retainers 100 may be stacked one atop the other such that the latch structure 126 disposed atop each side wall 102, 104 interlockingly engages in a non-rotational manner the complimentary latch structure 128 disposed at the bottom of each side wall 102, 104. Once engaged, the troughs 118 are aligned with each other, do not face one another and are symmetric to the common plane H that is perpendicular to the bottoms of the troughs 118 as shown in FIG. 6. In addition, the bottom wall 106 of the upper cable retainer 100 closes off the opening formed by the trough 118 of the lower cable retainer 100. Thus, a series of cable retainers 100 may be securely stacked on a substrate to mount a plurality of bundles adjacent thereto in a secure fashion.

Another embodiment of the stackable cable management retainer similar to the above embodiment, which can also be used in ladder rack applications, is shown in FIGS. 7–10. The various views of FIGS. 7–10 show that this embodiment of cable retainer 200 generally possesses many of the similar structural and functional features of the previous vertical entry retainer described above with respect to FIGS. 1–6, while providing a side entry or loading action. Again, the cable retainer 200 of the second embodiment is substantially a cube-shaped body 201 having a side wall 202 and substantially horizontally planar top and bottom walls 204 and 206, respectively, which are joined by the vertically oriented substantially planar side wall 202. Bundle access is from the opposite curvilinearly U-shaped side wall 208 which is disposed on an axis B at a slight angle to a horizontal plane H forming a cable trough 210 as shown in FIG. 8. Thus, the trough 210 is asymmetric with respect to the plane H that is perpendicular to the bottom of the trough 210 defined by wall 208 as shown in FIG. 8. In addition, the trough 210 extends along a longitudinal axis A that is parallel to the direction that the retention post extension 214 extends. The bottom wall 206 has a cable tie slot 212 centrally oriented and extending through the cable retainer 200 parallel to axis A so that a conventional cable tie may be used to attach the cable retainer 200 to a substrate as described in detail above. Also, located extending outwardly from the planar cable retainer side 202 is a retention post extension 214 which is structurally and functionally identical to the retention post extension 114 described in FIG. 1.

Located on the top wall 204 of the cable retainer 200 is a latch structure that includes two substantially triangularly-shaped and parallel oriented alignment locating device projections 216. These device projections 216 are used when the subsequent retainers 200 are stacked on top of one another as shown in FIG. 11 and do not extend across the width of the top wall 204. These alignment locating device projections 216 are correspondingly received in a non-rotational manner in a latch structure that includes two areas 218 formed in the bottom wall 206 adjacent respective corners of the cable retainer 200 which are complimentarily inversely triangularly shaped and possess two small latches disposed therein. Cooperation between the projections 216 and the areas 218 locks one cable retainer 200 to another. As shown by the bottom two cable retainers 200 of FIG. 11, the cable retainers 200 can be attached so that their troughs 208 face in the same direction while still not facing each other. As shown by the top two cable retainers 200 of FIG. 11, the cable retainers 200 can also be attached so that their troughs face in opposite directions while still not facing one another. As can also be seen from FIG. 11, the orientation of the retention post extension 214 may be swapped end for end depending upon the application. One advantage to this embodiment is the care with which cable bundle changes may be made, in other words, the stacked assembly does not need to be separated in order to removed a single cable bundle from the middle of a stack. This is so because each of the troughs 208 is open or exposed since their openings are not enclosed by the structure of adjoining cable retainers as is the case with the stacked cable retainers of FIG. 6.

Figure 12:
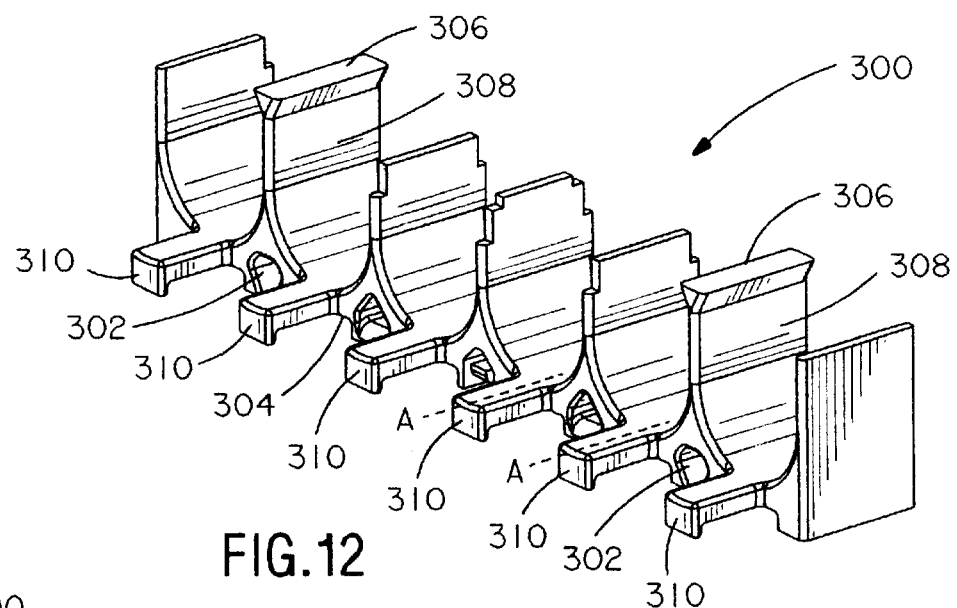
FIG. 12 is a perspective view of a third embodiment of a cable retainer in accordance with the present invention.
Figure 13:
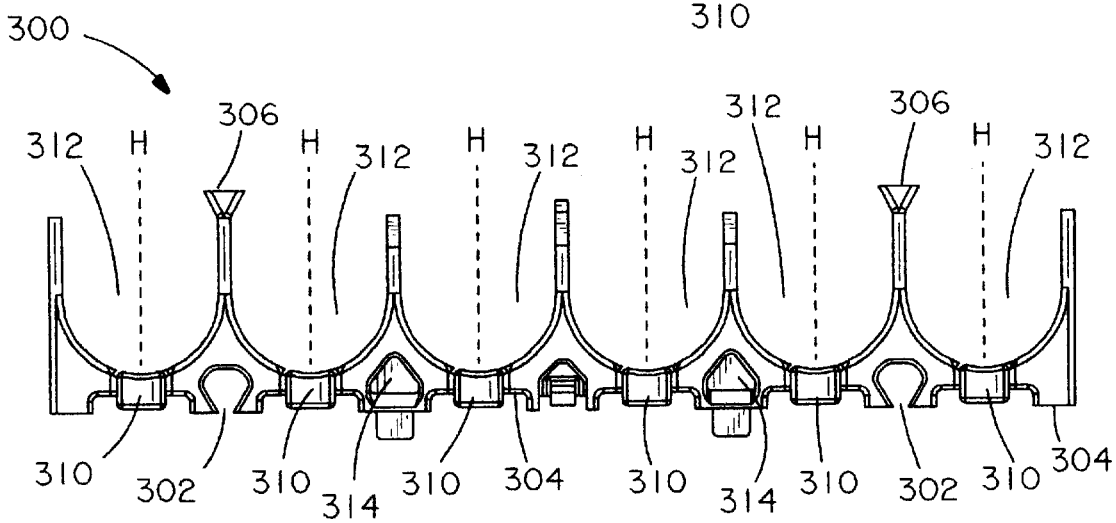
FIG. 13 is a front view of the cable retainer of FIG. 12.
Figure 14:
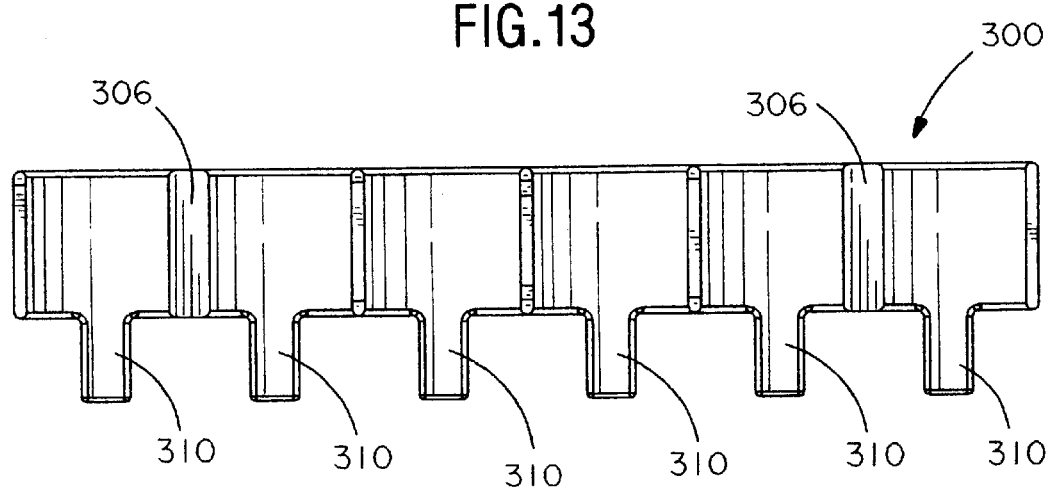
FIG. 14 is a bottom view of the cable retainer of FIG. 12.

An additional embodiment of a cable retainer 300 is shown in FIGS. 12–14 that shows a multiple cable installation format similar to that shown in FIG. 1. For example, each of the troughs 312 is symmetric with respect to the plane H that is perpendicular to the bottom of the trough 312 as shown in FIG. 13. In addition, each of the troughs 312 extends along a longitudinal axis A that is parallel to the direction that the retention post extensions 310 extend.

While one of the most noticeable differences is the size and shape of the cable retainer 300, there are other notable differences. For example, a single centrally located latch structure, such as channels 302, is disposed on the bottom wall 304 for interlocking engagement with the corresponding latch structure, such as distal ends 306, disposed above the centrally oriented vertical rib member 308. To stack the multiple cable retainers 300, the triangularly-shaped distal ends 306 of the two outer vertical rib members 308 are aligned with and inserted into the correspondingly shaped receiving channels 302 until the distal ends 306 and the channels 302 interlockingly engage one another in a non-rotational manner without relative movement between the adjacent cable retainers 300. In this manner a number of multiple cable retainers may be stacked one upon another in a manner similar to the stacking shown in FIG. 6. Again, a retention post extension 310 is provided for each cable trough 312 to secure the associated cable bundle in position. Cable tie slots 314 are also provided so that the base of the cable retainer 300 may be adequately secured to a substrate.

While the particular embodiment of the present invention has been shown and described, it will be obvious to those skilled in the art that changes and modifications may be made without departing from the invention and its broader aspects. The matter set forth in the foregoing description and accompanying drawings is offered by way of illustration only and not as a limitation.

We claim:

1. A cable retainer comprising:
   a body with a trough formed therein that extends along a longitudinal axis;
   a retention post extension that is attached to and extends away from said body along a direction that is parallel to said longitudinal axis.

2. The cable retainer of claim 1, wherein said retention post extension comprises a downward projection.

3. The cable retainer of claim 1, wherein said body comprises:
   a first wall;
   a second wall parallel to said first side wall; and
   a third wall joining said first wall to said second wall.

4. The cable retainer of claim 1, wherein said trough is formed from a U-shaped side.

5. The cable retainer of claim 4, wherein said U-shaped side is a top wall.

6. The cable retainer of claim 4, wherein said U-shaped side is a side wall.

7. The cable retainer of claim 5, wherein said first wall comprises a first latching component and said second wall comprises a second latching component that opposes said first latching component.

8. The cable retainer of claim 1, wherein said retention post extension is located adjacent an interface of said third wall and a face of said cable retainer.

9. The cable retainer of claim 1, wherein a slot is formed in said body that extends parallel to said longitudinal axis.

10. The cable retainer of claim 1, wherein said body comprises:
- a first latch structure; and
- a second latch structure that is complementary to said first latch structure.

11. The cable retainer of claim 10, wherein said first latch structure comprises a triangularly-shaped projection.

12. The cable retainer of claim 1, wherein said trough is symmetric with respect to a plane that is perpendicular to a bottom of said trough.

13. The cable retainer of claim 4, wherein said trough is symmetric with respect to a plane that is perpendicular to a bottom of said trough.

14. The cable retainer of claim 1, wherein said trough is asymmetric with respect to a plane that is perpendicular to a bottom of said trough.

15. The cable retainer of claim 4, wherein said trough is asymmetric with respect to a plane that is perpendicular to a bottom of said trough.

16. A method of retaining a cable comprising:
- providing a cable retainer comprising:
  - a body with a trough formed therein that extends along a longitudinal axis; and
  - a retention post extension that is attached to and extends away from said body along a direction that is parallel to said longitudinal axis;
- placing a cable within said trough; and
- wrapping a cable tie around said cable and said retention post extension.

17. The method of claim 16, further comprising preventing said cable tie from being disassociated with said cable retainer when said cable is placed under any type of load.

18. A cable retainer comprising:
- a first body comprising:
  - a first trough formed therein that extends along a longitudinal axis; and
  - a first latch structure;
- a retention post extension that is attached to and extends away from said first body along a direction that is parallel to said longitudinal axis;
- a second body comprising:
  - a second trough formed therein that extends parallel to said longitudinal axis; and
  - a second latch structure that is complementary to and engages said first latch structure;
- wherein said second trough does not face said first trough.

19. The cable retainer of claim 18, wherein said retention post extension comprises a downward projection.

20. The cable retainer of claim 18, wherein said trough is asymmetric with respect to a plane that is perpendicular to a bottom of said trough.

21. The cable retainer of claim 18, wherein said second trough is aligned with said first trough.

22. The cable retainer of claim 21, wherein said first trough and said second trough are symmetric with respect to a common plane that is perpendicular to a bottom of said first trough.

23. The cable retainer of claim 21, wherein said first trough and said second trough face in opposite directions.

24. The cable retainer of claim 23, wherein said trough is asymmetric with respect to a plane that is perpendicular to a bottom of said trough.

25. The cable retainer of claim 21, wherein said first trough is closed by said second body.

26. The cable retainer of claim 21, wherein said first trough and said second trough are open.

27. The cable retainer of claim 21, wherein said first latch structure comprises a triangularly-shaped projection.

* * * * *